US010360790B2

(12) United States Patent
McMonagle

(10) Patent No.: US 10,360,790 B2
(45) Date of Patent: Jul. 23, 2019

(54) SAFETY TOUCH BUTTON SYSTEM HAVING AN INTERCOMMUNICATIONS LINK

(71) Applicant: Banner Engineering Corp., Plymouth, MN (US)

(72) Inventor: Tom McMonagle, Plymouth, MN (US)

(73) Assignee: Banner Engineering Corp., Plymouth, MN (US)

( * ) Notice: Subject to any disclaimer, the term of this patent is extended or adjusted under 35 U.S.C. 154(b) by 734 days.

(21) Appl. No.: 15/136,013

(22) Filed: Apr. 22, 2016

(65) Prior Publication Data
US 2017/0310389 A1    Oct. 26, 2017

(51) Int. Cl.
F16P 3/00    (2006.01)
G08C 17/02    (2006.01)
G08C 23/04    (2006.01)

(52) U.S. Cl.
CPC .............. *G08C 17/02* (2013.01); *F16P 3/003* (2013.01); *G08C 23/04* (2013.01)

(58) Field of Classification Search
CPC ...................................... F16P 3/003
See application file for complete search history.

(56) References Cited

U.S. PATENT DOCUMENTS

| | | |
|---|---|---|
| 3,746,818 A | 7/1973 | Bertelloti |
| 3,895,269 A | 7/1975 | Geremia |
| 4,412,268 A | 10/1983 | Dassow |
| 4,905,001 A | 2/1990 | Penner |
| 4,918,560 A | 4/1990 | Storer |
| 4,939,358 A | 7/1990 | Herman et al. |
| 5,077,467 A | 12/1991 | Barron, Jr. et al. |
| 5,134,259 A | 7/1992 | Page, Jr. |
| 5,168,173 A | 12/1992 | Windsor |
| 5,196,832 A | 3/1993 | Griffin |
| 5,212,621 A | 5/1993 | Panter |
| 5,233,231 A | 8/1993 | Wieth et al. |
| 5,264,739 A | 11/1993 | Gundlach |
| 5,367,158 A | 11/1994 | Herman et al. |
| 5,396,222 A | 3/1995 | Markus et al. |
| 5,397,890 A | 3/1995 | Schueler et al. |
| 5,410,148 A | 4/1995 | Barron, Jr. et al. |

(Continued)

FOREIGN PATENT DOCUMENTS

GB        795996 A  *  6/1958  ............... H02P 1/02

*Primary Examiner* — Fritz M Fleming
(74) *Attorney, Agent, or Firm* — Craige Thompson; Thompson Patent Law

(57) ABSTRACT

Apparatus and associated methods relate to dual safety touch button systems for generating machine operation commands, according to predetermined safety guidelines, from status information received via an intercommunications link (ICL) operably connecting the dual safety touch buttons (STBs). In an illustrative example, each of a pair of STBs includes a processor configured to receive, via an intercommunications link port, status information from the other STB. In response to the received information and predetermined safety guidelines, the STBs may generate machine operation commands that operate a pair of relay switches. In some embodiments, each STB may be activated within a substantially simultaneous period (e.g., less than 0.5 seconds) to actuate corresponding relay switches for operating a potentially dangerous machine.

20 Claims, 16 Drawing Sheets

(56) References Cited

U.S. PATENT DOCUMENTS

| | | |
|---|---|---|
| 5,451,770 A | 9/1995 | Stewart |
| 5,629,594 A | 5/1997 | Jacobus et al. |
| 5,665,961 A | 9/1997 | Matzka |
| 5,781,398 A | 7/1998 | Fenske et al. |
| 5,856,646 A | 1/1999 | Simon |
| 5,880,418 A | 3/1999 | Livesay |
| 5,936,435 A | 8/1999 | Schwenkel et al. |
| 6,285,021 B1 | 9/2001 | Fayfield |
| 6,392,169 B1 | 5/2002 | Linger et al. |
| RE37,777 E | 7/2002 | Herman et al. |
| 6,628,015 B2 | 9/2003 | Pullmann et al. |
| 6,787,940 B2 | 9/2004 | Pullman |
| 6,809,911 B2 | 10/2004 | Dickhoff et al. |
| 7,187,091 B2 | 3/2007 | Veil et al. |
| 7,236,849 B2 | 6/2007 | Walsh |
| 7,723,630 B1 | 5/2010 | Jordan et al. |
| 7,898,118 B2 | 3/2011 | Nitsche et al. |
| 7,948,121 B2 | 5/2011 | Nitsche et al. |
| 8,058,578 B1 | 11/2011 | Jordan et al. |
| 8,274,771 B2 | 9/2012 | Veil |
| 8,675,330 B2 | 3/2014 | Korrek |
| 2005/0203641 A1 | 9/2005 | Manner |
| 2013/0113304 A1 | 5/2013 | Pullmann et al. |
| 2013/0233044 A1 | 9/2013 | Arth et al. |
| 2015/0015089 A1 | 1/2015 | Le et al. |

* cited by examiner

| Contact State Change | | 1st in time to change | 2nd in time to change |
|---|---|---|---|
| Turning On | Open to Closed | No Contact Degradation | Arcing degradation due to live load switching |
| Turning Off | Closed to Open | Arcing degradation due to live load switching | No Contact Degradation |

FIG. 10

SAFETY TOUCH BUTTON SYSTEM HAVING AN INTERCOMMUNICATIONS LINK

TECHNICAL FIELD

Various embodiments relate generally to safety control systems for operating machinery.

BACKGROUND

Safety controls are used in a variety of industrial applications. Some safety controls require multiple switches to operate potentially dangerous machines. Mechanical switches, for example, may be used in a safety control system.

Some potentially dangerous machines are switched ON/OFF under the control of optical touch buttons. Optical touch button may detect the presence of an operator's hand, for example, via a beam break sensor, such that when the operator's hand breaks a light beam of the beam break sensor, presence is detected. When operating potentially dangerous machines, a pair of optical touch buttons may be placed apart such that an operator can operate the machinery only when the presence of both hands are detected by the optical touch buttons.

SUMMARY

Apparatus and associated methods relate to dual safety touch button systems for generating machine operation commands, according to predetermined safety standards, from status information received via an intercommunications link (ICL) operably connecting the dual safety touch buttons (STBs). In an illustrative example, each of a pair of STBs includes a processor configured to receive, via an intercommunications link port, status information from the other STB. In response to the received information and predetermined safety guidelines, the STBs may generate machine operation commands that operate a pair of relay switches. In some embodiments, each STB may be activated within a substantially simultaneous period (e.g., less than 0.5 seconds) to actuate corresponding relay switches for operating a potentially dangerous machine.

Apparatus and associated methods may also relate to live load switching in dual safety touch button systems. Live load switching (LLS) includes at least a pair of safety touch buttons (STBs) configured to distribute degradation events (e.g., spark/arc across the contacts of relays) among a pair of relays based on information shared between the STBs via an intercommunications link. In an illustrative example, each STB is operably connected to a relay, each STB actuates its corresponding relay according to degradation event information shared between the STBs via the intercommunications link. In some embodiments, the degradation event information may include which relay was subject to the degradation event during previous cycles. For example, the first relay contact to open and the last relay contact to close will typically absorb the brunt of a degradation event as the relay is de-energized or energized, respectively. The STBs may advantageously coordinate opening and closing their respective relay contacts to share equally the degradation events to extend the service life of the relays.

Various embodiments may achieve one or more advantages. For example, the intercommunications link may vitiate the need for an external control system to coordinate activity between a pair of STBs. The intercommunications link may transmit information between processors of the pair of STBs to coordinate the activity of the STBs. In some examples, the intercommunications link may permit two STBs to coordinate their interactive safety functions without an external controller. Some embodiments may be modular in nature. For example, in the event that a STB malfunctions, only the malfunctioning STB needs to be replaced. In various embodiments, in the event of a faulty relay, an operator may need only replace the faulty relay. In some embodiments, the coordinated shared opening and closing of the relay contacts may extend the service life of the relays.

The details of various embodiments are set forth in the accompanying drawings and the description below. Other features and advantages will be apparent from the description and drawings, and from the claims.

BRIEF DESCRIPTION OF THE DRAWINGS

FIG. 10 depicts a table illustrating an exemplary live load switching (LLS) sequence for a pair of serially connected switches.

Like reference symbols in the various drawings indicate like elements.

DETAILED DESCRIPTION OF ILLUSTRATIVE EMBODIMENTS

Figure 1:
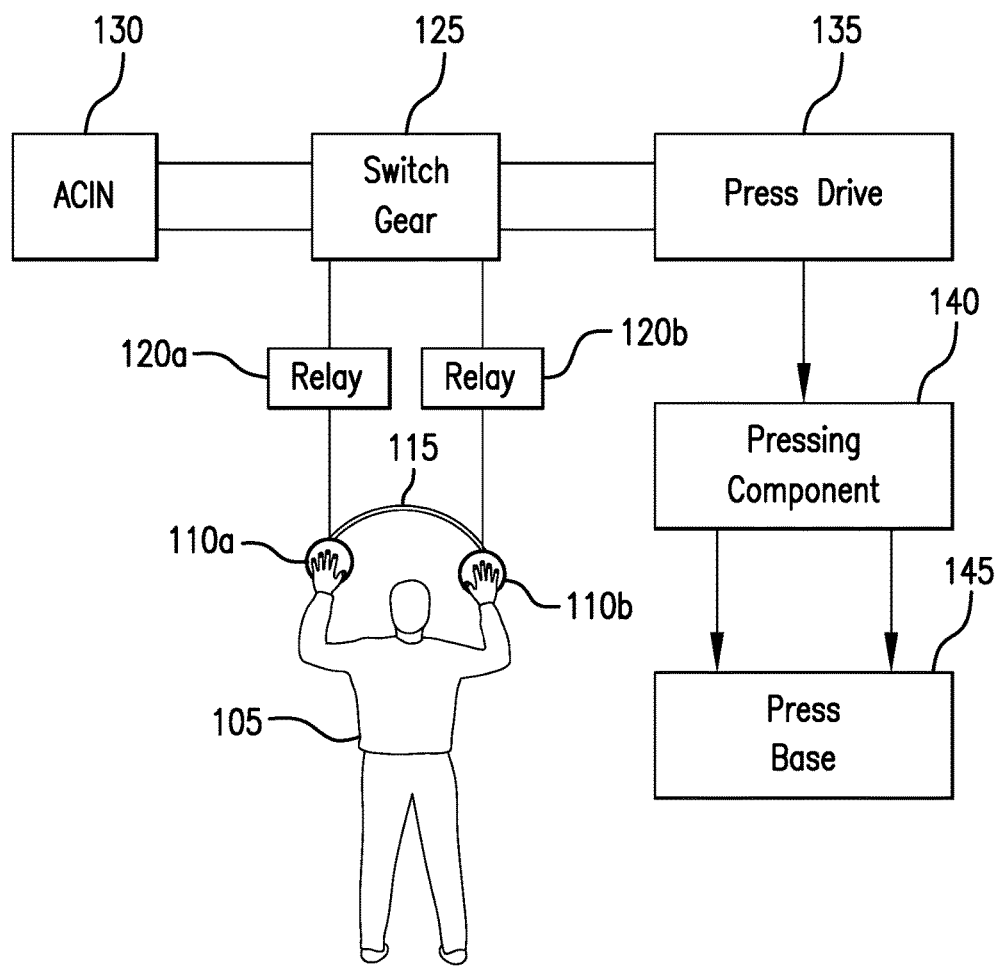
FIG. 1 depicts an operator using an exemplary dual STB system to operate a press machine.

FIG. 1 depicts an operator using an exemplary dual STB system to operate a press machine. As depicted, an operator 105 places each of opposing hands on a STB 110a, 110b. The STBs 110a, 110b communicate with each other via an intercommunications link (ICL) 115 to coordinate activities according to predetermined safety guidelines. Each STB 110a, 110b operates a respective safety relay 120a, 120b. The safety relays 120a, 120b, when activated, by the STBs 110*a*, 110*b*, respectively, cause a machine control element 125 (labelled in example of FIG. 1 as "Switch Gear") to operate such that a power source 130 provides an operating power via the machine control element 125 to a press drive 135. In response, the press drive 135 operates a pressing component 140 that engages a press base 145.

In some embodiments, the press component 140 may be operated by electrical actuators, for example, such as rotating or linear electric motors. In various embodiments, the electric machines may be coupled to the press component 140 via a direct shaft or via a gearing mechanism. In some embodiments, the machine control element 125 may use an electrically controlled valve for hydraulic or pneumatic pressure to actuate the press component 140 to forcibly engage a work piece (not shown) between the press component 140 and the press base 145. In accordance with safety guidelines, the operator's 105 hands must be detected at the STB 110*a*, 110*b* during a potentially dangerous actuation of the press component 140 to prevent the operator 105 from being injured by the press component 140.

Figure 2:
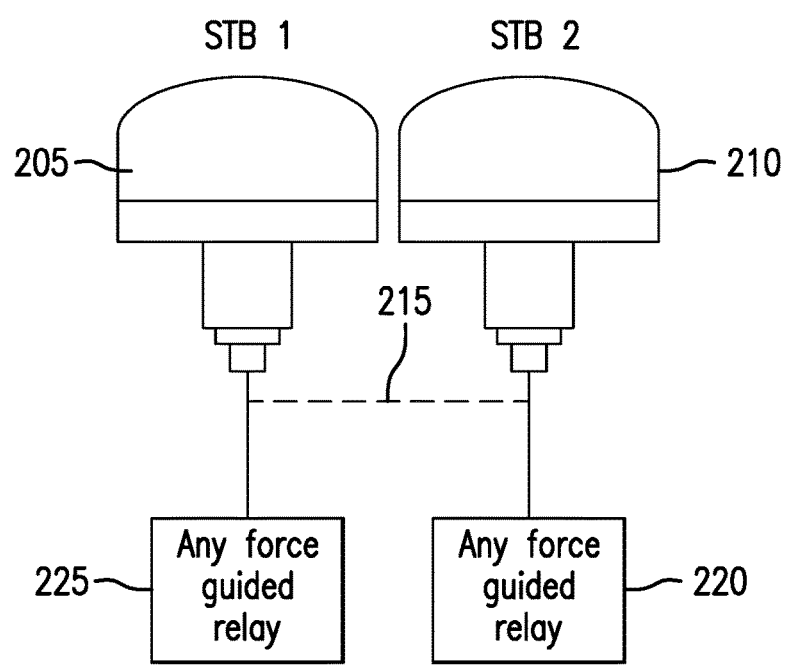
FIG. 2 depicts a schematic view of an exemplary dual STB system with an ICL.

FIG. 2 depicts a schematic view of an exemplary dual STB system with an ICL. A pair of STBs 205, 210 are communicatively coupled via an ICL 215. Each STB 205, 210 actuates a respective safety relay 225, 220. In some embodiments, the ICL 215 transfers status information about each STB 205, 210 to each other. For example, the presence of an operator's hand may be detected at STB 205 to generate a presence signal. The presence signal, indicating the presence of the operator's hand, may be transmitted to the STB 210 via the ICL 215. In response to the received information, the STB 210 may actuate the safety relay 220 in accordance with predetermined safety guidelines. The STB 210 may transmit via the ICL 215 activity information (e.g., actuating the safety relay 220) to the STB 205. In response to the received activity information from STB 210, the STB 205 may actuate the safety relay 225 in accordance with predetermined safety guidelines. The safety relays 220, 225 may cause operation of a potentially dangerous machine (e.g., a press machine). In some embodiments, the relays 220, 225 may be force guided relays.

Figure 3A:
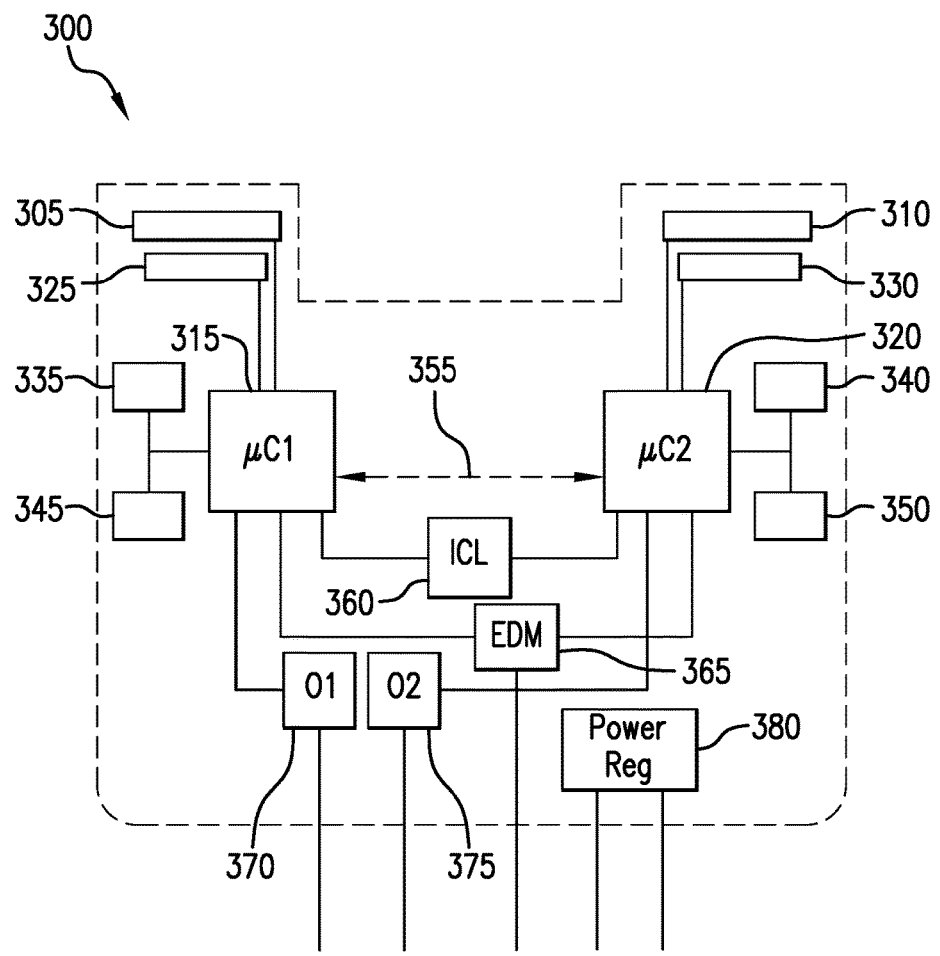
FIG. 3A depicts a functional block diagram of an exemplary STB.

FIG. 3A depicts a functional block diagram of an exemplary STB. The STB 300 includes a housing to enclose various components of the STB 300. A pair of optical receivers 305, 310 are disposed in the housing. The pair of optical receivers 305, 310 receive, from a pair of optical transmitters 325, 330 an optical beam. In some embodiments, a break in the optical beam indicates the presence of an operator's hand.

The optical receiver 305 connects to a first controller 315. The receiver 310 connects to a second controller 320. Each controller 315, 320 connects to a non-volatile memory component 335, 340, and a random-access memory component 345, 350. Each controller 315, 320 is in operable communication, via a communication bus 355, with each other. An ICL port 360 connects to both of the controllers 315, 320. In various embodiments, the ICL port 360 may receive an ICL (described in greater detail in FIG. 3B). The ICL may be used to transmit and receive information from an external source. In some embodiments, controller 315 may control communication with controller 320 in a master-slave relationship. In some embodiments, the external source may be computer system or mobile device, for example.

A port for external device monitoring (EDM) 365 connects to both of the controllers 315, 320. The EDM 360 may be used for contactor monitoring, such as, for example, monitoring the status of the safety relay 225. In some embodiments, the EDM 365 transmits received information about an external device to the controllers 315, 320 such that the controllers 315, 320 coordinate activities between the STB 300 and the external device. For example, the controllers 315, 320 may coordinate a lockout state between the STB 300 and the external device if the information received through the EDM 360 indicates an unfavorable operating condition according to predetermined safety guidelines. For example, the safety relay 225 may weld causing an unfavorable operating condition (e.g., permanent closure).

The controller 315 connects to an output interface 370. The controller 320 connects to an output interface 375. A power regulator 380 resides within the housing 305 to provide operating power to the STB. In some embodiments, the controllers 315, 320 may communicate with each other via the communication bus 355 to generate instruction commands to be transmitted to an external device via the output interface 370 and the output interface 375. In various embodiments, the generated instruction commands may actuate the safety relay 225 to close a circuit. The generated instruction commands may be configured to electrically control machine control elements. For example, the generated instruction commands may control electrically controlled safety valves.

Figure 3B:
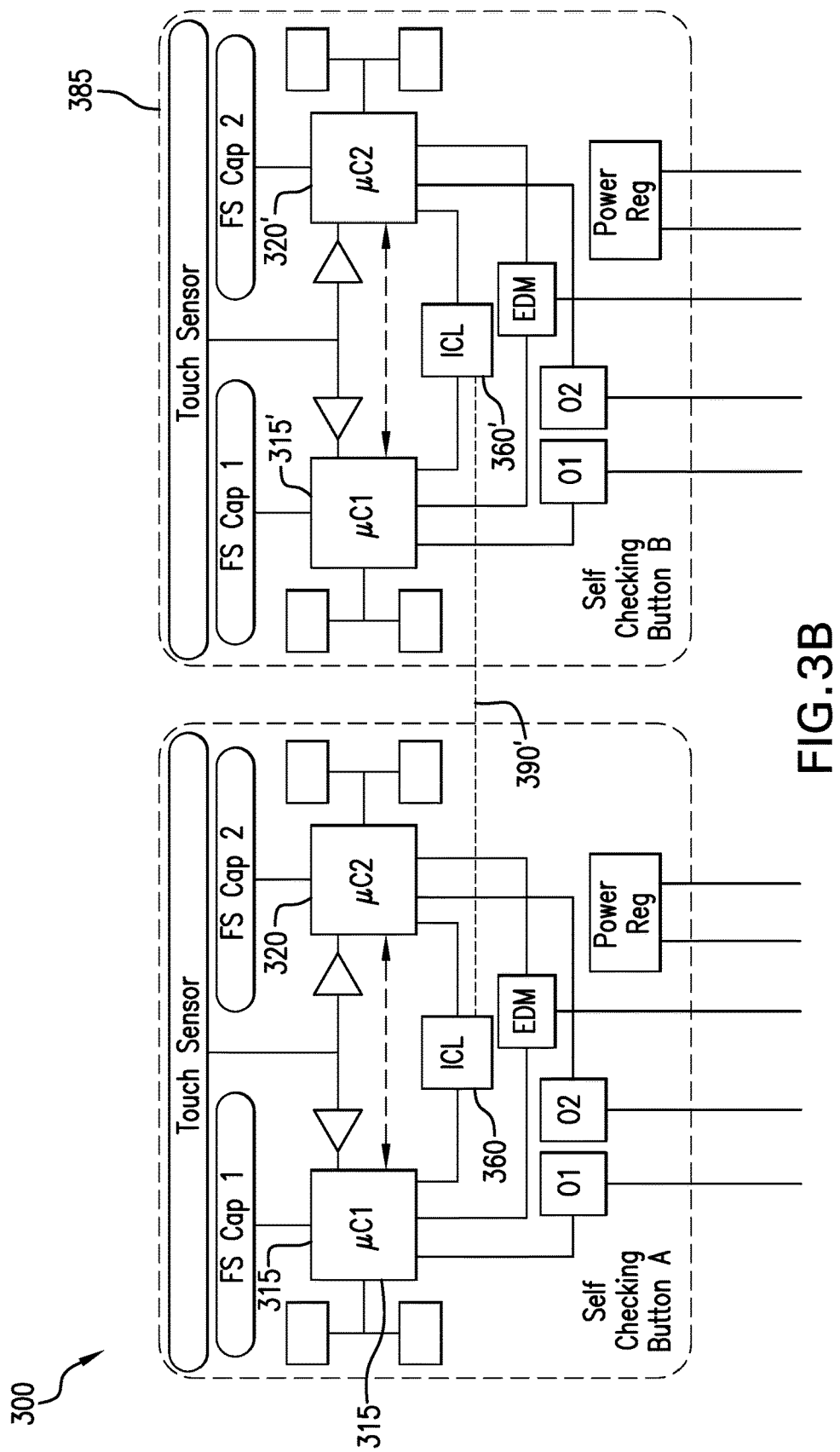
FIG. 3B depicts a functional block diagram of dual exemplary STBs connected by an ICL.

FIG. 3B depicts a functional block diagram of dual exemplary STBs connected by an ICL. As depicted, STB 300 includes a touch sensor (shown at TS1) is disposed on a side of the housing. The touch sensor TS1 is operably coupled to a pair of capacitive sensors (shown as FS Cap 1/2). In some embodiments, the capacitive sensors detect the presence of an operator's hand when the operator's hand is at a predetermined proximity to the touch sensor 310.

As depicted, a STB 385 is a replica of the STB 300. The STB 385 includes an ICL port 360' in operable communication with respective controllers 315', 320' of the STB 385. An ICL 390 connects to the ICL port 360 and the ICL port 360' to transmit information between the STBs 300, 385. In some embodiments, the ICL 390' may be any cable for transmitting information, such as, for example, a Cat6 network cable or a fiber optic cable. In various embodiments, the ICL ports 360, 360' may include a wireless networking component. The wireless network components of the ICL ports 360, 360' may communicate with each other wirelessly to define the ICL 390'.

Figure 4A:
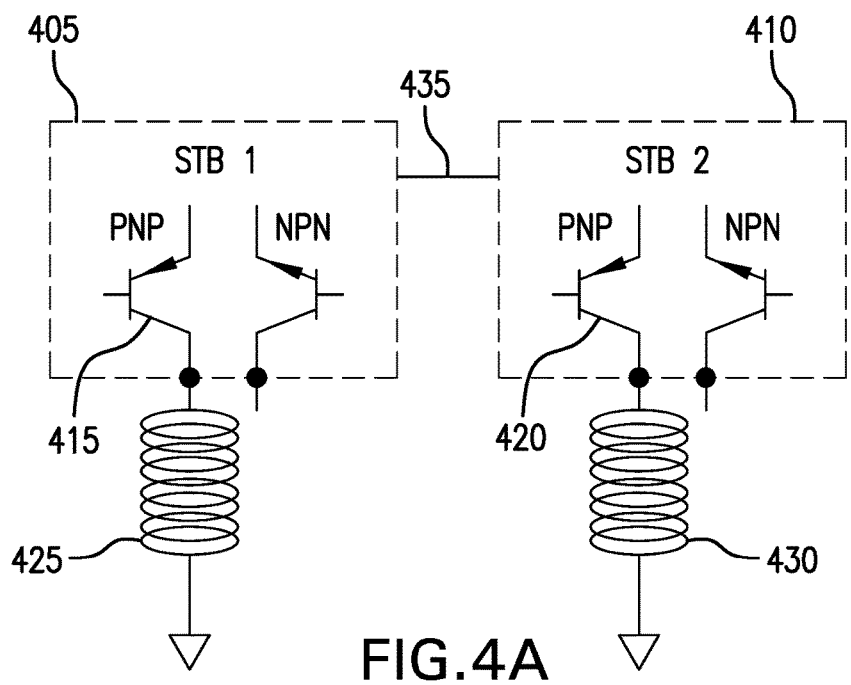
FIG. 4A depicts a block diagram of a pair of single transistor STBs connected by an exemplary ICL.

FIG. 4A depicts a block diagram of a pair of single transistor STBs connected by an exemplary ICL. As depicted, a pair of STBs 405, 410 each includes a PNP transistor 415, 420. Each transistor connects to a respective relay coil 425, 430. In some embodiments, each transistor may connect to a respective solenoid. An ICL 435 connects the STBs 405, 410 to each other to transmit information between the STBs 405, 410. Each STB 405, 410 includes circuitry to control the relay coils 425, 430. The circuitry generates operation commands to the relay coils 425, 430 based on information shared between the STBs 405, 410 via the ICL 435. The information shared between the STBs 405, 410 may include the status of the relay coils 425, 430 and an initial signal timing between two signals that energize the relay coils 425, 430. In some embodiments, safety functions or self-tests executed by the STBs 425, 430, may have an ultimate ON/Off-state authority. For example, in the event that a fault (e.g., electrical malfunction) of the STB 405 is detected, the fault information may be transmitted via the ICL 435 to the STB 410. In response to the received fault information and in accordance with predetermined safety guidelines, the STB 410 may deactivate. In various embodiments, the STB 410 may remain deactivated until the fault detected in the STB 405 is remedied. In some embodiments, a system reset (e.g., power down/up cycle) may be required after a fault is detected.

Figure 4B:
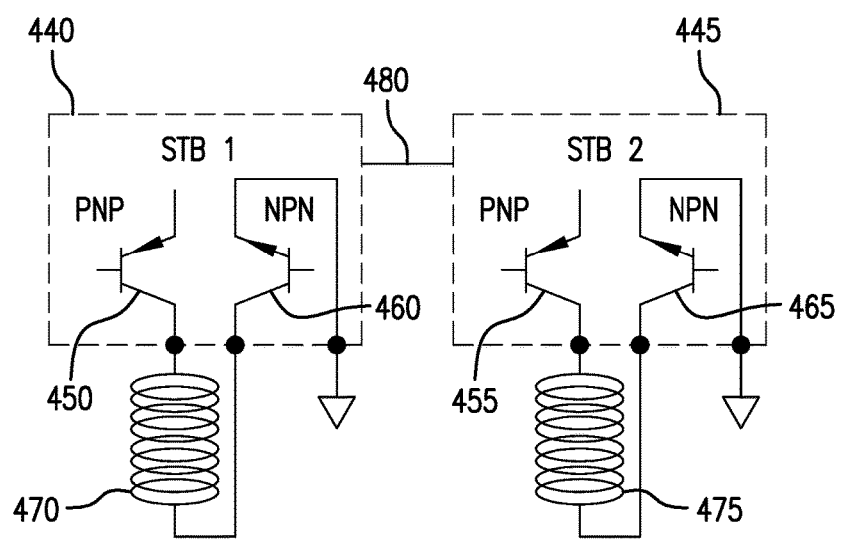
FIG. 4B depicts a block diagram of a pair of dual transistor STBs connected by an exemplary ICL.

FIG. 4B depicts a block diagram of a pair of dual transistor STBs connected by an exemplary ICL. As depicted, a pair of STBs 440, 445 each includes a PNP transistor 450, 455 and a NPN transistor 460, 465. Each transistor connects to a respective relay coil 470, 475. An ICL 480 connects the STBs 440, 445 to each other to transmit information between each other. Each STB 440, 445 includes circuitry to control the relay coils 470, 475. The circuitry generates operation commands to the relay coils 470, 475 based on information shared between the STBs 440, 445 via the ICL 480. The PNP transistors 450, 455 may provide a connection from an operating power (e.g., 20 vdc not shown) to the relay coils 470, 475. The NPN transistors 460, 465 may provide a connection from a ground potential to the relay coils 470, 475.

In some embodiments, the NPN transistors 460, 465 may function to disconnect the path to ground for the relay coils 470, 475 in response to a fault in the PNP transistors 450, 455. In various embodiments, in the event that a fault is detected in both PNP transistors 450, 455 simultaneously, the NPN transistors 460, 465 may disconnect the path to ground for both relay coils 470, 475. In some embodiments, the dual-transistor STBs 440, 445 connected by the ICL 480 may offer improved ON to OFF state response times.

Figure 4C:
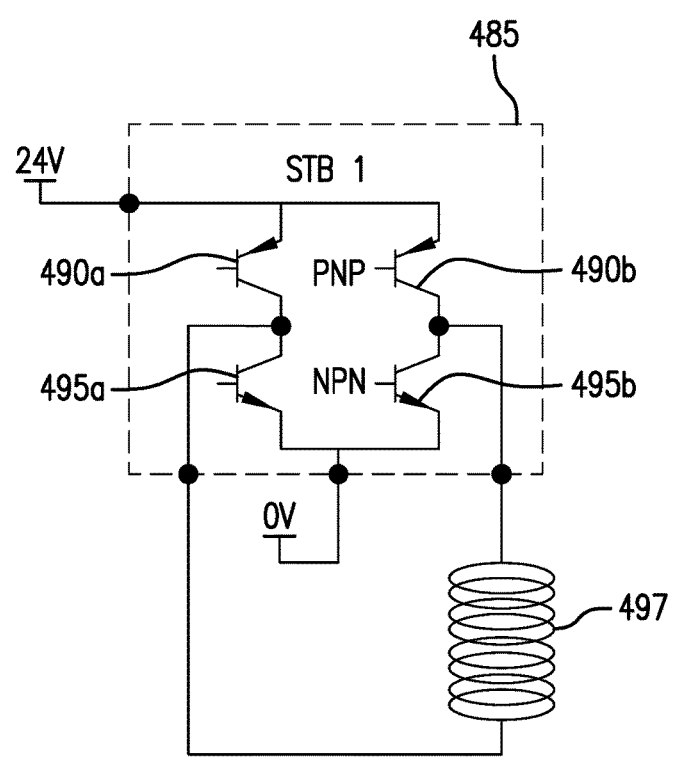
FIG. 4C depicts a block diagram of an exemplary multi-transistor STB.

FIG. 4C depicts a block diagram of an exemplary multi-transistor STB. A STB 485 includes an H-bridge arrangement with a pair of PNP transistors 490a, 490b and a pair of NPN transistors 495a, 495b. Each PNP transistor 490a, 490b is serially connected to a respective NPN transistor 495a, 495b. A relay coil 497 connects to the STB 485 such that a polarity of the relay coil 497 may change to electromagnetically force the relay coil to an OFF state. In some embodiments, the ON to OFF response times may be improved over the ON to OFF response times of the single transistor STB 405 by changing the polarity of the current in the coil. For example, the coil may be charged such that the coil may electromagnetically assist the spring force used to return the contacts to their OFF state.

Figure 5A:
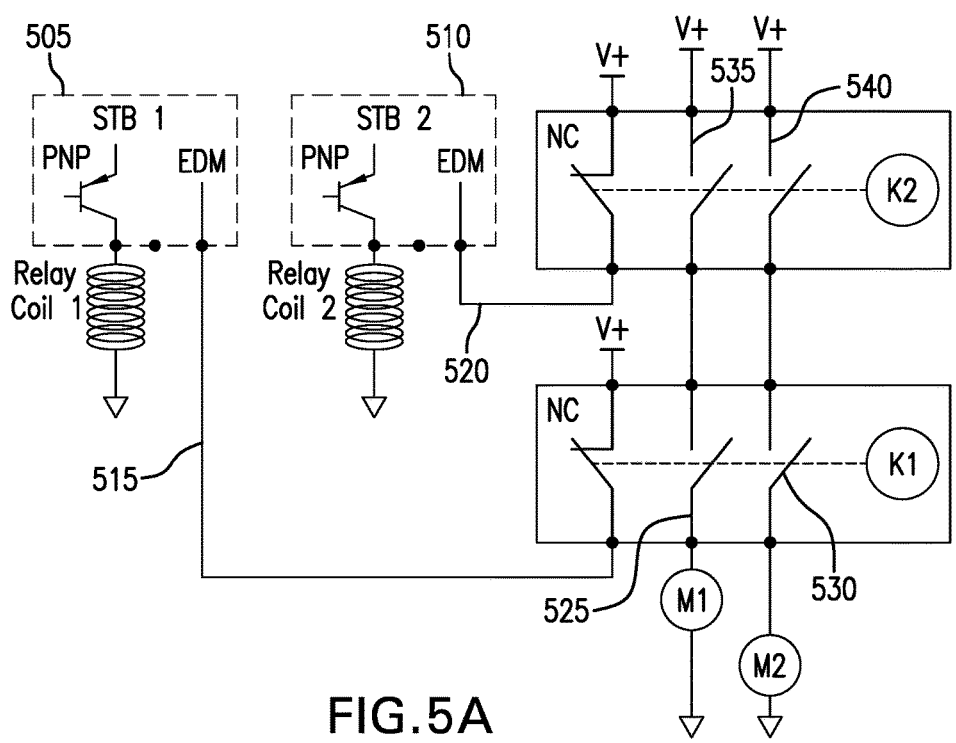
FIG. 5A depicts a block diagram of an exemplary dual STB system using dual external device monitoring (EDM) channels.

FIG. 5A depicts a block diagram of an exemplary dual STB system using dual external device monitoring (EDM) channels. A pair of STBs 505, 510 each includes an EDM channel 515, 520. The EDM channels 515, 520 may monitor a set of relay contacts. For example, as depicted, the EDM channel 515 monitors, via a NC contact, a set of relay contacts 525, 530. The EDM channel 520 monitors, via a NC contact, a set of relay contacts 535, 540. As depicted, the relay contact 525 and the relay contact 535 are serially connected. The relay contact 530 and the relay contact 540 are also serially connected. In some embodiments, the EDM channels 515, 520 monitor the normally-closed (NC) contacts of the relays 525-540. The EDM, by monitoring the NC contacts, may identify if any of the relay contacts 525-540 experience a slow or welded contact. In various embodiments, the EDM may detect other characteristics, such as, for example, chatter or bounce sensing.

Figure 5B:
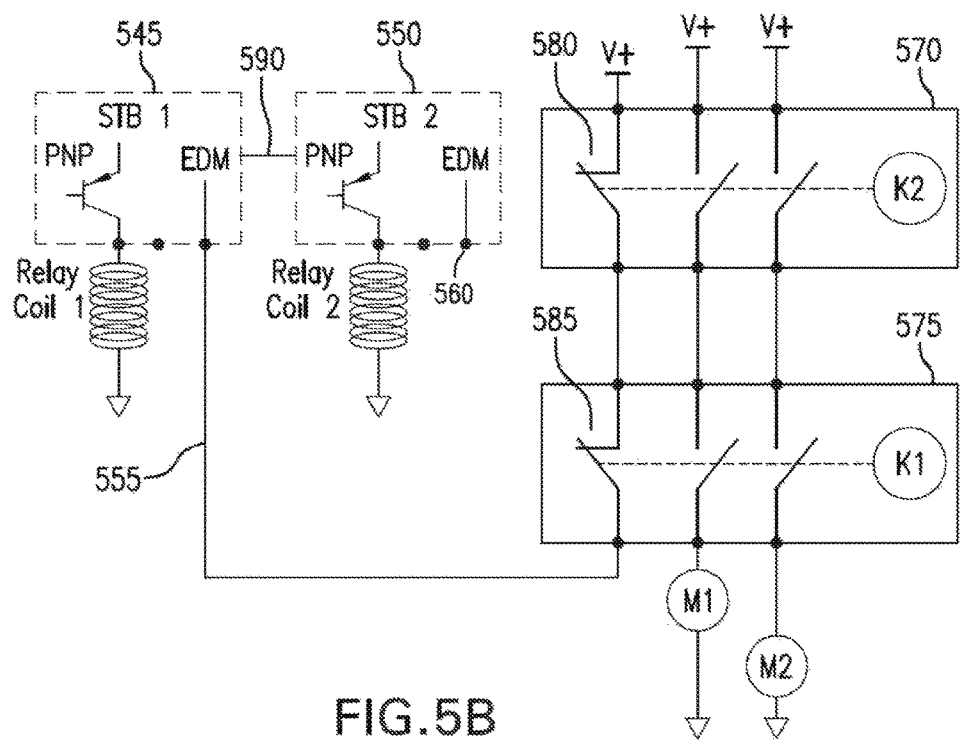
FIG. 5B depicts a block diagram of an exemplary dual STB system using a single EDM channel.

FIG. 5B depicts a block diagram of an exemplary dual STB system using a single EDM channel. A pair of single transistor STBs 545, 550 each includes an EDM channel 555, 560. As depicted, only the EDM channel 555 of STB 545 monitors both sets of relays 570, 575 via a pair of NC contacts 580, 585. The NC contacts 580, 585 are serially connected to the EDM channel 555. An ICL 590 connects the STBs 545, 550 to each other to share information. In some embodiments, the STBs 545, 550 may share information about slow relay contacts or whether a welded contact has occurred, for example. In some embodiments, the STB 545 may include an algorithm to determine which sets of relays 570, 575 experienced a fault. For example, in the event that the single EDM channel 555 detects, via a pair of NC contacts 580, 585, a fault in either of the set of relays 570 or the set of relays 575, the EDM channel may not be able to determine whether the fault occurred in the set of relays 570 or the set of relays 575. As such, a non-volatile memory component of the STB 545 may include an algorithm used to determine which of the set of relays 570 or the set of relays 575 experienced the detected faulted. In various embodiments, the use of the single EDM channel 555 to monitor both sets of relays 570, 575 may permit the EDM channel 560 to be used for another purpose.

Figure 6:
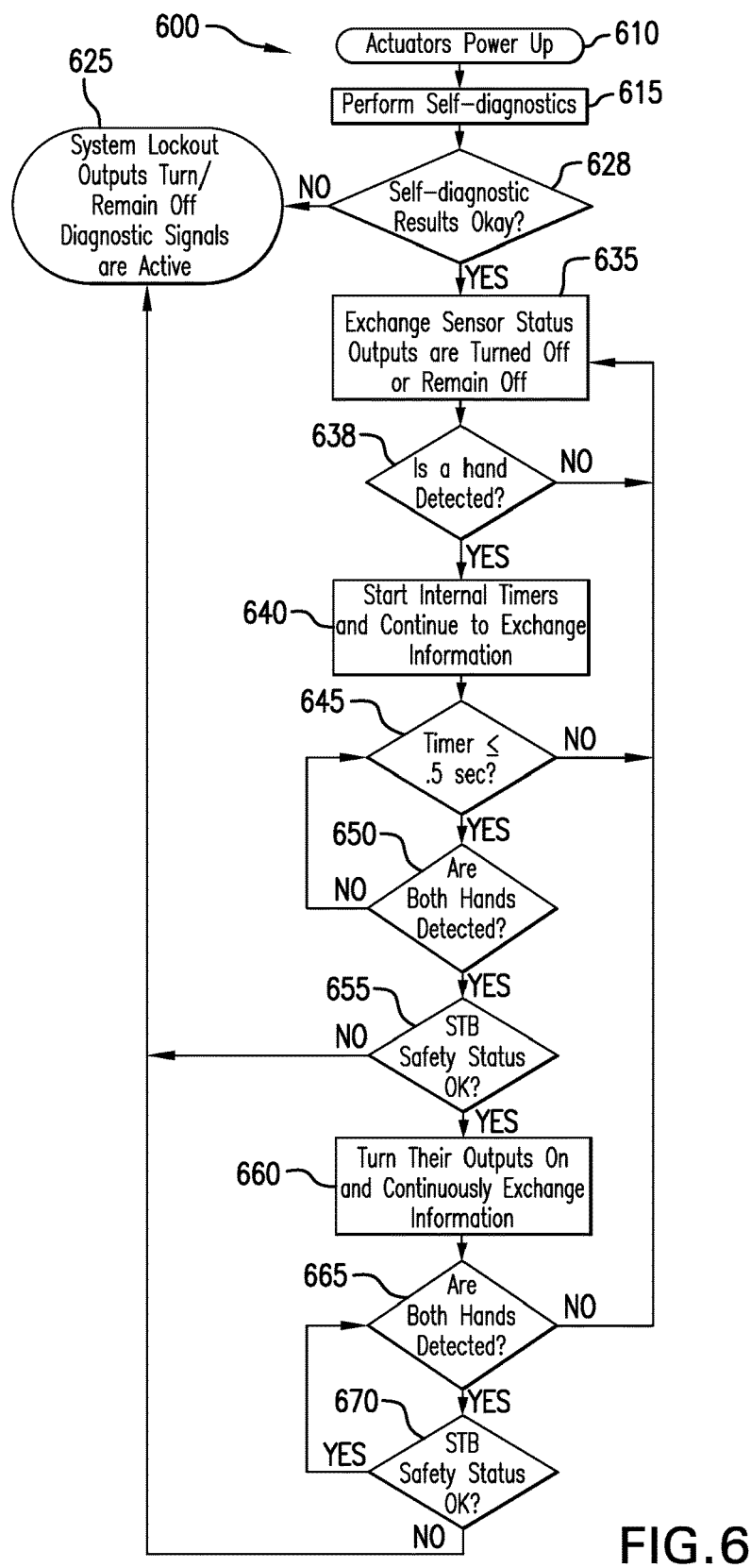
FIG. 6 depicts a flow chart of an operation cycle for a pair of STBs with an ICL.

FIG. 6 depicts a flow chart of an operation cycle for a pair of STBs with an ICL. A method 600 for activating dual STBs according to predetermined safety guidelines begins by powering up the STBs, at 610. Upon powering up, at 610, each STB performs self-diagnostic operations, at 615, to ensure proper functionality. In some embodiments, the self-diagnostic operations may include testing the sensors 325, 330 and the output interfaces 370, 375. In other embodiments, the self-diagnostic operations may include verifying the states of the sensors 325, 330. The self-diagnostic operations generate, at 628, results to be evaluated. If the self-diagnostic results are negative, a system lockout initiates, at 625, to prevent potentially unsafe operation of a machine. If the self-diagnostic results are positive, each STB exchanges information, at 635, via the ICL 390'. The exchanged information may include safety operation status for the STBs 300, 385, sensor status information for each STB 300, 385, or whether the output ports of the STBs 300, 385 are available to transmit operation commands.

At 638, the sensors of the STBs 300, 385 determine whether an operator's hand is detected. If, at 638, an operator's hand is not detected, the method 600 continually exchanges information, at 635, to determine whether an operator's hand is detected, at 638. If, at 638, an operator's hand is detected, both STBs 300, 385 begin internal timers and continue to exchange safety and sensor status information, at 640.

Following the exchange of safety and sensor status information, at 640, the STBs 300, 385 determine whether an elapsed time, based on the internal timers, has exceeded a predetermined time period, at 645. In some embodiments, the predetermined time period may be 0.5 seconds. If the elapsed time has exceeded the predetermined time period, step 635 repeats. If the elapsed time has not exceeded the predetermined time period, at 650, it is determined whether or not both hands are detected. If both hands are not detected, step 645 repeats. If both hands are detected, the safety status of the STBs 300, 385 are checked, at 655.

If the safety status is negative, at 655, a system lockout initiates, at 625, to prevent potentially unsafe operation of a machine. If the safety status is positive, the STBs 300, 385 initiate their respective output interfaces, at 660. At 665, a second determination of whether both of the operator's hands are detected is determined. If both hands are not detected, steps 635-660 repeat. If both hands are detected, it is determined whether or not the status of the STBs 300, 385 are okay, at 670. If the status of one of the STBs 300, 385 is not okay, a system lockout initiates, at 625, to prevent potentially unsafe operation of a machine. If the status of both of the STBs 300, 385 is okay, step 665 repeats.

In some embodiments, the method 600 includes steps for performing self-diagnostic routines on individual components, such as, for example, the ICL port. In various examples, performing self-diagnostic routines on the ICL port 360 of the STB 300 may determine whether communication is established with the ICL port 360' of the STB 385.

Figure 7:
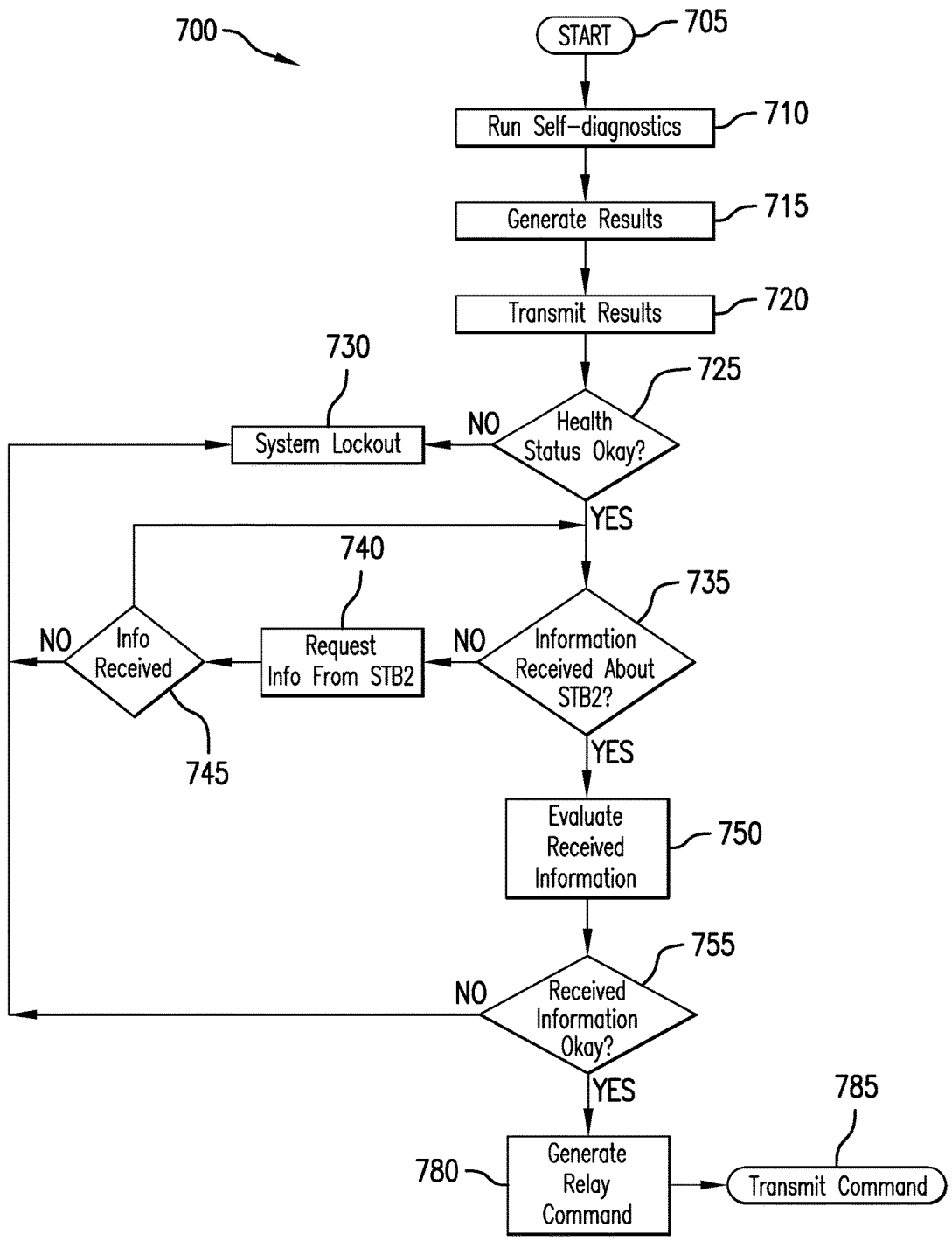
FIG. 7 depicts a flow chart for activating a single STB having an exemplary ICL.

FIG. 7 depicts a flow chart for activating a single STB having an exemplary ICL. The method 700 begins when the STB 300 is powered on, at 705. The STB 300 executes, at 710, a self-diagnostic procedure for determining whether the STB 300 is operating correctly. The self-diagnostic procedure generates, at 715, a health status indicator for the STB 300 based on the results of the self-diagnostic procedure. The health status indicator is transmitted, at 720, via the ICL 390' to the ICL port 360' for the STB 385. At 725, it is determined whether the health status indicator is positive. In some embodiments, a positive health status indicator may indicate proper functionality of the STB 300. If the health status indicator is not positive, a system lockout initiates, at 730, to prevent potentially unsafe operation of a machine. If the health status indicator is positive, it is determined, at 735, whether information about the STB 385 was received via the ICL 390'.

If no information about STB 385 was received, at 740, the STB 300 requests information from the STB 385 via the ICL. In some embodiments, the information shared between the STB 300 and the STB 385 may include status information about safety relays that may be connected to the STBs 300, 385. At 745, the STB 300 determines whether information about the STB 385 was received. If no status information about the STB 385 is received, a system lockout initiates, at 730, to prevent potentially unsafe operation of a machine. If status information about the STB 385 is received, step 735 repeats.

At 750, if status information about the STB 385 is received, the received status information is evaluated to determine a health status indicator for the STB 385. At 755, the STB 300 determines whether the health status indicator for the STB 385 is positive. If the health status indicator for the STB 385 is not positive, a system lockout initiates, at 730, to prevent potentially unsafe operation of a machine. If the health status indicator for the STB 385 is positive, the STB 300 generates operation commands at 780, based on the shared information between the STBs 300, 383 and predetermined safety guidelines, for actuating a safety relay switch. At 785, the generated operation commands are transmitted to the safety relay switch.

Figure 8:
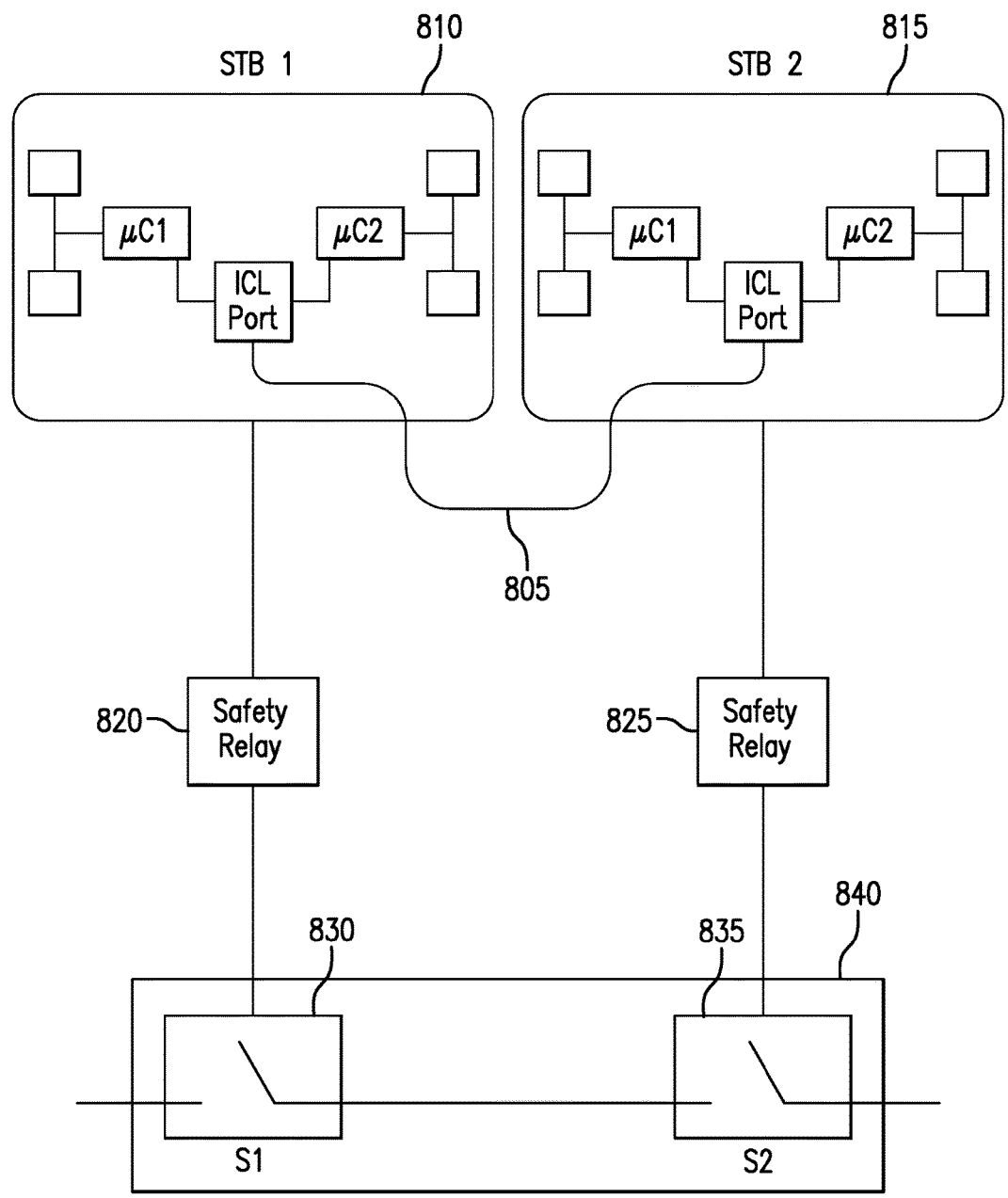
FIG. 8 depicts a block diagram of dual STBs having an exemplary ICL to actuate a pair of serially connected switches.

FIG. 8 depicts a block diagram of dual STBs having an exemplary ICL to actuate a pair of serially connected switches. An ICL 805 connects a pair of STBs 810, 815 to each other to exchange status information about the pair of STBs 810,815 between each other. Each STB 810, 815 operates a safety relay 820, 825. The safety relays 820, 825 actuate a pair of serially connected switches 830, 835 included within a machine control element 840. In various embodiments, the connected switches may be electrically controlled control elements, such as, for example, a solenoid.

In some embodiments, the STBs 810, 815 share information about their respective switches 830, 835. The shared information may include information pertaining to the sequence of activation and deactivation for the switches 830, 835. For example, during an activation cycle (e.g., both STBs 810, 815 are activated to actuate the switches 830, 835), the switch 830 may activate (e.g., close) first. As the switch 830 activates first, the switch 830 does not experience a degradation event because the switch 835 remains deactivated (e.g., open). The switch 835 will activate after the switch 830 activates. The switch 835 will be subjected to a degradation event as when the switch 835 activates the circuit is closed to conduct operating power through the machine control element 840. In various embodiments, the STBs 805, 815 may coordinate a sequence to determine which of the switches 830, 835 will activate first during given activation cycle.

Figure 9:
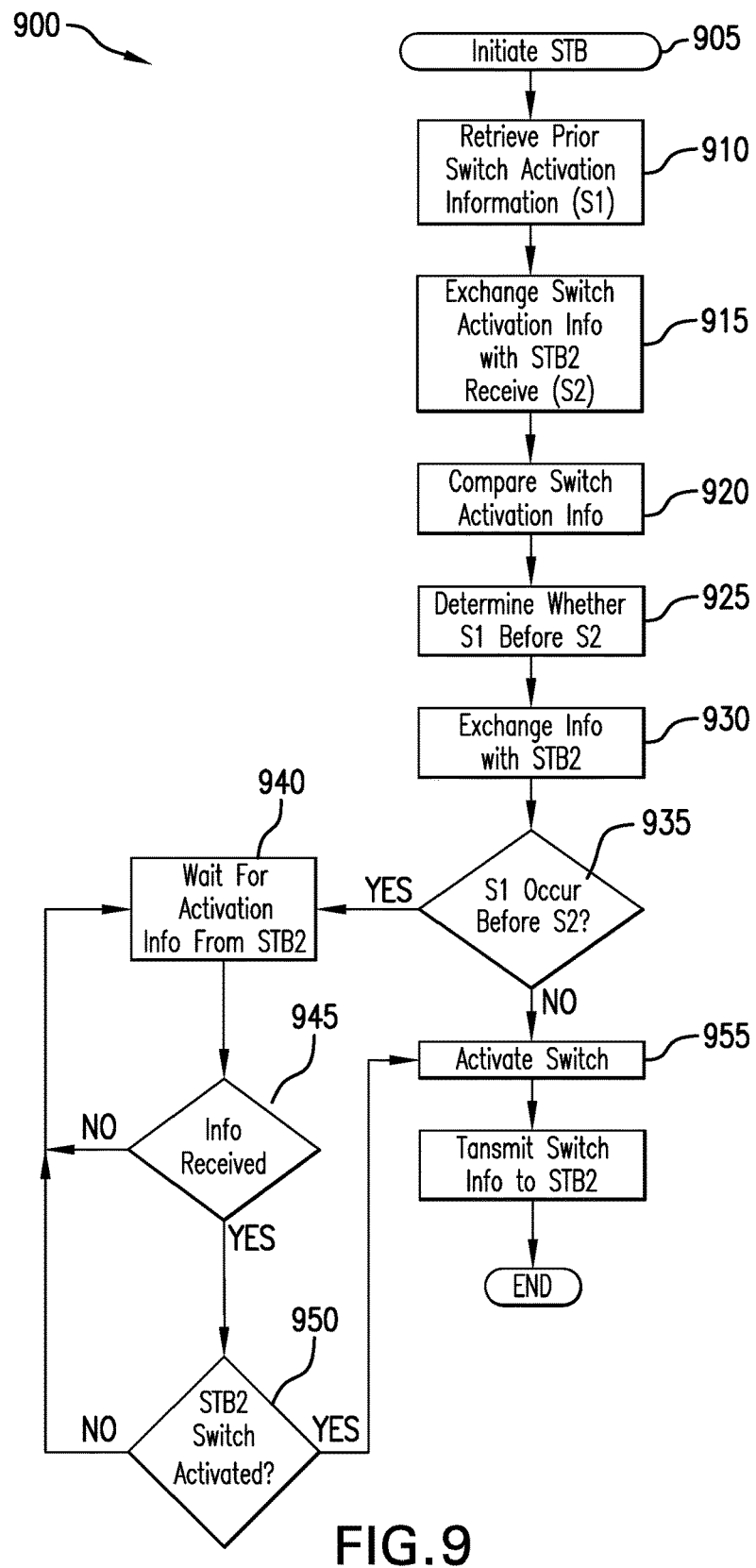
FIG. 9 depicts a flow chart for a STB to determine a sequence of activation for one of a pair of serially connected switches actuated by the STB.

FIG. 9 depicts a flow chart for a STB to determine a sequence of activation for one of a pair of serially connected switches actuated by the STB. A method 900 for determining a sequence of activation for one of a pair of serially connected switches 830, 835 begins, at 905, by initiating the STB 810. The STB 810 retrieves, at 910, information concerning the activation time of the switch 830 during a prior activation state. The STB 810 receives, at 915, via the ICL 805 information concerning the activation time of the switch 835 from the STB 815. In some embodiments, at 915, the STB 810 may transmit information concerning the activation time of the switch 830 to the STB 815.

At 920, the STB 810 compares the retrieved activation time of the switch 830 to the received activation time of the switch 835. The STB 810, at 925, determines whether the retrieved activation time of the switch 830 has a more recent activation time than the received activation time of the switch 835. The STB 810 transmits, at 930, whether the retrieved activation time of the switch 830 has a more recent activation time than received activation time of the switch 835 to the STB 815. In various embodiments, the STB 810 may receive, at 925, whether a retrieved activation time of the switch 835 has a more recent activation time than a received activation time of the switch 830 from the STB 815. If whether the retrieved activation time of the switch 830 has a more recent activation time than the received activation time of the switch 835, from 925, matches the information from the STB 815, the method 900 proceeds to step 935. If the no match is found, the method 900 may include a series of steps to determine how to proceed in accordance with predetermined safety standards.

At 935, if the switch 830 does have a prior activation time than the switch 835, the STB 810 waits, at 940, to receive the activation status, via the ICL 805, of the switch 835 from the STB 815. At 945, if the STB 810 does not receive the activation status of the switch 835, the STB 810 will continue to wait at 940. If the STB 810 does receive, at 945, an activation status about the switch 835 from the STB 815, the STB 810 will determine, at 950, whether the activation status of the switch 835 is active. In some embodiments, an active status may indicate that the switch 835 is closed. If the activation status of the switch 835 is not active, step 940 repeats. If the activation status of the switch 835 is active, the STB 810 will actuate the switch 830, at 955. At 935, if the switch 830 does not have a prior activation time than the switch 835, the STB 810 will actuate the switch 830, at 955. At 960, the STB 810 will transmit via the ICL 805 the activation status of the switch 830 to the STB 815.

In some embodiments, the method 900 may require that all steps be executed under a predetermined time. In various embodiments, the method 900 may be a sub-routine of the method 700. In some embodiments, the STBs 810, 815 may execute the method 900 substantially synchronized. In an exemplary embodiment, the method 900 may cause the pair of serially connected switches 830, 835 to alternately activate (e.g., close) and deactivate (e.g., open). In some embodiments, prior activation times for the switches 830, 835 may not be available. The method 900 may include a series of steps to determine how to proceed in accordance with predetermined safety guidelines when no prior activation information is available.

In various embodiments, each STB may compare random numbers to determine which STB will be the first in time to turn on its outputs to energize its corresponding relay (ON authority). For example, after a machine cycle event, the STB having turn ON authority may send a message to the other STB that it now has the turn On authority and so on. In some embodiments, the method for turn Off authority may also compare random numbers to determine which STB should have de-energize first in time (OFF authority).

FIG. 10 depicts a table illustrating an exemplary live load switching (LLS) sequence for a pair of serially connected relay contacts. A table 1000 illustrates degradation events for serially connected relay contacts. A degradation event may occur when a relay contact changes from a first state to a second state. For example, the first state may be an open state and the second state may be close state. As such, when a contact transitions from the open state to the close state, a dielectric breakdown limit for air (e.g., 76 v/mil) may be exceeded. When the dielectric breakdown limit is exceeded, the air may ionize allowing a current to flow, via the ionized air, between relay contact points. The current flow includes a flow of highly concentrated electrons across the relay contacts causing the small relay contact point to get very hot. The heat may cause the relay contact points to turn into pits. The pits may get bigger and spread across the relay contacts causing the contacts to weld.

The table of FIG. 10 illustrates how the serially connected relay contacts are subjected to a degradation event. As depicted, the first row includes the titles, from left to right, "Contact State Change", "$1^{st}$ in time to change", and "$2^{nd}$ in time to change". Under the title "Contact State Change", two columns include the state and the corresponding action. For example, as depicted, the first column of the second row includes the state "Turning On" and the second column of the second row includes the corresponding action, "Closed to Open", for the "Turning On" state. The first column of the third row includes the state "Turning Off" and the second column of the third row includes the corresponding action, "Open to Closed", for the "Turning Off" state.

Each of the titles "$1^{st}$ in time to change" and "$2^{nd}$ in time to change" represent an event to one of the pair of serially connected relay contacts. For example, the third column of the second row under the title "$1^{st}$ in time to change" designates "No Contact Degradation" while the fourth column of the second row designates an "Arcing degradation due to live load switching." As depicted, the second row illustrates that during a "Turning On" state, the contact designated as the "$1^{st}$ in time to change" will not be subjected to a degradation event, while the STB designated as the "$2^{nd}$ in time to change" will be subjected to a degradation event. The third row illustrates that during a "Turning Off" state, the STB designated as the "$1^{st}$ in time to change" will be subjected to a degradation event, while the STB designated as the "$2^{nd}$ in time to change" will not be subjected to a degradation event. As such, the degradation events are equally shared between the contacts. In some embodiments, live load switching may increase the service life of the serially connected relay contacts.

Figure 11:
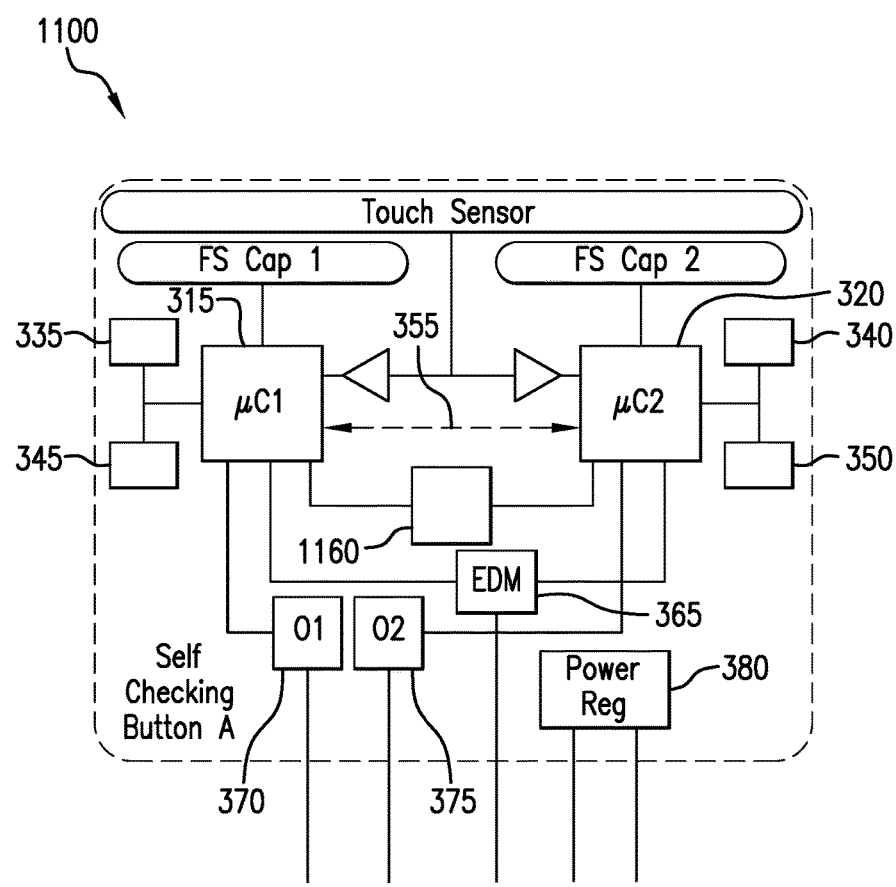
FIG. 11 depicts a functional block diagram of an exemplary STB with a monitoring module.

FIG. 11 depicts a functional block diagram of an exemplary STB with a monitoring module. The non-volatile memory components 335, 340 of the STB-MM 1100 may include an executable set of instructions that when executed by the controllers 315, 320 execute self-diagnostic procedures to ensure that the STB-MM 1100 is properly functioning. The non-volatile memory components 335, 340 may further include instructions to perform monitoring of the output signals transmitted via the output interfaces 370, 375. In the event that an issue is detected by the monitoring of the output signals, the non-volatile memory components 335, 340 may include instructions to be executed by the controllers 315, 320 in response to the detected output signal issue.

The STB-MM 1100 includes a monitoring module 1160. The monitoring module 1160 may receive output signals from a monitored external device. In some embodiments, the external device may be a monitored STB that does not include a monitoring module 1160 or an ICL port 360. In various embodiments, the monitoring module 1160 may be an analog signal processor configured to receive monitored signals from the monitored STB. The non-volatile memory components 335, 340 may include executable set of instructions that when executed by the controllers 315, 320 determine an operating status of the external device based on the received monitored signals. In response to the determined operating status, the controllers 315, 320, via instructions included in the non-volatile memory components 335, 340 may execute a set of instructions to disable functionality of either the STB-MM 1100 or safety relays that may be operated by the STB 1100 to prevent the operation of a potentially dangerous machine.

In various embodiments, when the STB-MM 1100 with the monitoring module 1160 is connected to receive output signals from an older STB without a monitoring module, the STB-MM 1100 and the monitored STB may enter into a master-slave relationship. For example, the STB-MM 1100 may monitor all outputs from both the STB-MM 1100 and the monitored STB. The STB-MM 1100 may determine, based on the monitoring results, actions to ensure safety operation, or shutdown, of a potentially dangerous machine. The STB-MM 1100 may include shutdown authority to respond accordingly when a potentially dangerous event is detected. For example, the output of the STB may suffer a short. The STB-MM 1100 may detect, via the monitoring module 1160, the short of the STB-MM 1100. In response, the STB-MM 1100 may exercise its shutdown authority to deactivate a potentially dangerous machine. In some embodiments, the monitoring module 1160 may monitor multiple external devices.

Figure 12:
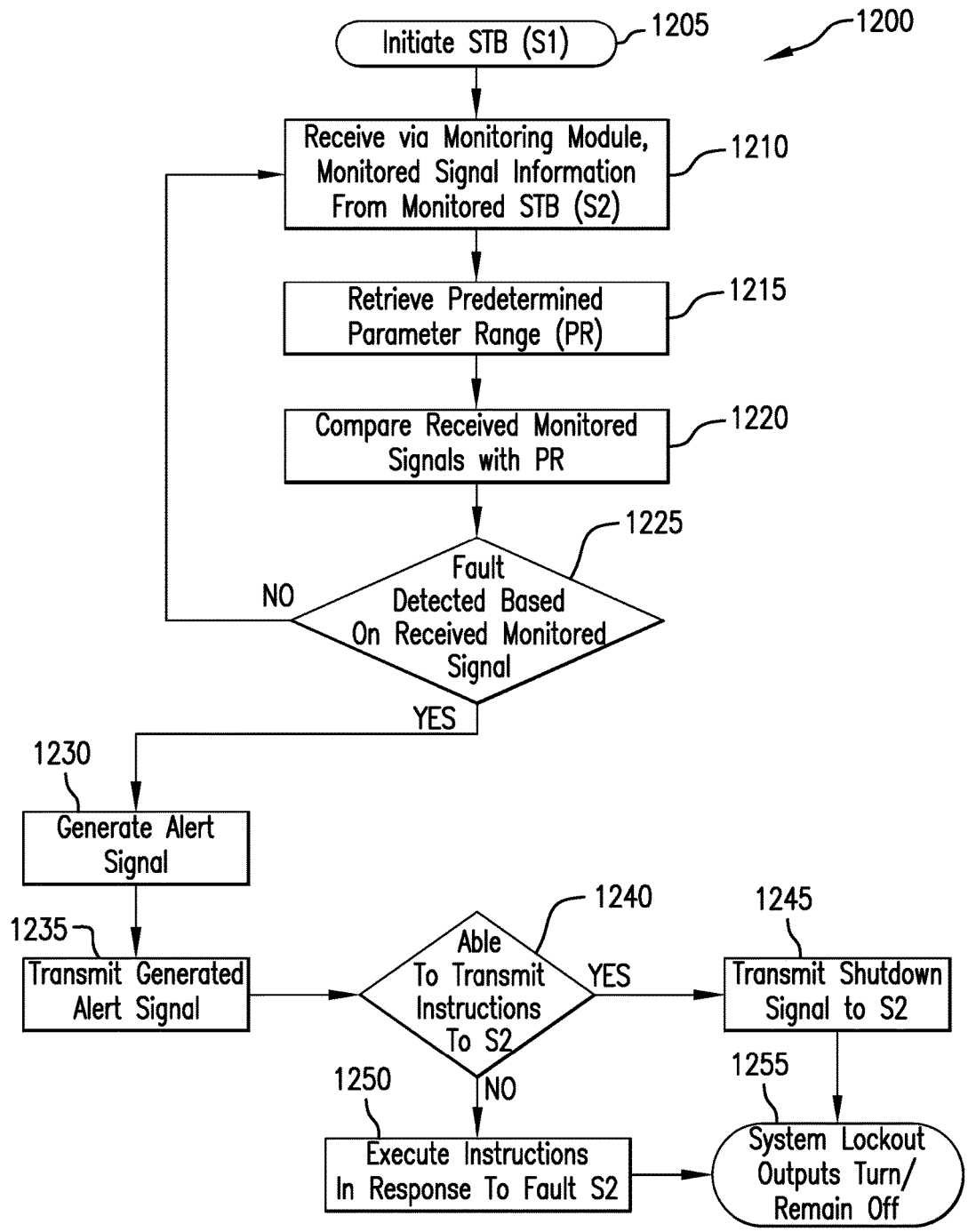
FIG. 12 depicts a flow chart for an exemplary STB with a monitoring module for monitoring received output signals.

FIG. 12 depicts a flow chart for an exemplary STB with a monitoring module for monitoring received output signals. The method 1200 initiates, at 1205, the STB-MM 1100. At 1210, the STB-MM 1100 receives, via the monitoring module 1160, monitored signals from an monitored external device, such as, for example, a monitored STB without a monitoring module. At 1215, the STB-MM 1100 retrieves, from the non-volatile memory components 335, 340, a predetermined parameter range. The STB-MM 1100 compares, at 1220, the received monitored signals to the predetermined parameter range. If no fault is detected, at 1225, step 1210 repeats. For example, the STB-MM 1100 may determine that no fault is present because the monitored signals are within the retrieved predetermined parameter range.

If a fault is present, at 1225, the STB-MM 1100 generates, at 1230, an alert signal indicating that a fault has been detected. At 1235, the STB-MM 100 transmits the generated alert signal. In some embodiments, the STB-MM 1100 may transmit the generated alert signal to a display screen. In various embodiments, the STB-MM 1100 may transmit the generated alert signal to a light source to activate a predetermined flash pattern to indicate that a fault has been detected. At 1240, the STB-MM 1100 determines whether the STB-MM 1100 may transmit instructions to the monitored external device. If, at 1240, the STB-MM 1100 determines that the STB-MM 1100 may transmit instructions to the monitored external device, the STB-MM 1100, at 1245, transmits a shutdown signal to the monitored external device. If, at 1240, the STB-MM 1100 determines that the STB-MM 1100 cannot transmit instructions to the monitored external device, the STB-MM 1100 executes, at 1250, instructions in response to the detected fault. The instructions executed at 1250 may be based on predetermined safety guidelines. For example, the STB-MM 1100 may execute instructions such that the STB-MM 1100 deactivates itself to prevent the operation of a potentially dangerous machine.

Although various embodiments have been described with reference to the Figures, other embodiments are possible. For example, the dual STBs with an ICL may be used to operate machine cycles for potentially dangerous machines. The STBs may connect and may communicate with each other via an ICL. The ICL may allow the STBs to communicate status information (e.g., operating state) with each other. In some embodiments, a operation cycle for a machine may require that each STB be initiated by an operator within a predetermined period of time (e.g., 0.5 seconds). The STBs may remain activated (e.g., operator must maintain hand contact) to complete the operation cycle.

In various embodiments, the STBs may be located at a predetermined distance apart (e.g., 24 inches) to prevent an operator from using one hand to operate both STBs. The STBs may include a self-checking safety system to prevent operation of the machine if one switch malfunctions (e.g., a relay may weld permitting operation even though switch is not activated). Such self-checking STBs have been described, for example at (Col. 2, Lines 17-19) and in FIGS. 1-3 of the U.S. Pat. No. 6,285,021, entitled "Self Checking Safety Switch," filed by Robert W. Fayfield on Jul. 27, 1999, the entire disclosure of which is hereby incorporated by reference. In some embodiments, the STBs may include translucent dome housing and LEDs to conveniently indicate the status of the machine (e.g., the power on/off status of the machine, whether a system reset is required, etc.). For example, a synchronized flash pattern may indicate proper functioning of the STB while an alternating flash pattern may indicate a fault with the STB. In some embodiments, different colored LEDs may indicate different status of the STB.

In some embodiments, the ICL may allow for cross-coupling exchange of status information between the STBs making the need for an additional controller to receive and process status information from the STBs unnecessary. Such a STB system may reduce the manufacturing costs because an additional controller is not needed. In some embodiments, a STB may be offered as a single SKU item. For example, if a single STB malfunctioned, only the single STB that malfunctioned would need to be replaced as opposed to the whole STB system as required by the current products. In various embodiments, the single SKU system may reduce field replacement costs, such as, for example, the cost of replacing a single STB versus the cost of replacing the entire STB system.

In various embodiments, LLS may involve controlling switching transitions in series-connected relays controlled by the two STBs to extend the service life of the relays. For example, a first relay to open and a last relay to close absorb the brunt of degradation (e.g., spark/arc across the contacts of the relays). LLS may coordinate sharing the degradation events equally to prevent premature failure of a relay that absorbs a disproportionate share of degradation events. In some embodiments, extending the service life of the relays may lead to fewer maintenance events and lower operating costs.

In some embodiments, additional sensors may be used with the STBs to increase safety operations of a potentially dangerous machine. For example, an eye-detection sensor may be placed such that an operator must face a certain direction to operate a machine. The eye-detection sensor may be connected to the STBs such that the STBs may prevent operation of the machine, even if the STBs have been activated, until the STBs receive a signal from the eye-detection sensor indication the operator's presence. The eye-detection sensor may prevent optical damage to an operator's eyes.

In various embodiments, a STB may incorporate a monitor function. For example, the STB may use an EDM channel in conjunction with a safety stop button. The safety stop button may be used to disable operation of a potentially dangerous machine. In some embodiments, sensors may identify an operator. For example, a fingerprint detection sensor may be used to ensure that the STBs activate only in response to a particular user. As such, in addition to the presence detection required to operate a potentially dangerous machine, an identification of a user may provide another layer of safety as it may prevent an unauthorized user from operating the potentially dangerous machine.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A two hand control safety system, the system comprising:
   a first safety touch button (STB) comprising:
   a housing;
   a sensor configured to generate a presence signal in response to the proximity of an operator's hand to the housing;
   a relay control output interface (RCOI) configured to transmit a relay command signal to a relay;
   an intercommunications link port operatively coupled to an intercommunication link (ICL);
   a controller operably coupled to the sensor, the RCOI and the intercommunications link port;
   a data store operably coupled to the controller, wherein the data store comprises a program of instructions that, when executed by the controller, cause the controller to perform operations to actuate a relay, the operations comprising:
   generate a relay command signal in response to the generated presence signal according to predetermined safety standard criteria;
   transmit the generated relay command to the relay via the RCOI;
   send, via the ICL port, outbound messages indicating a status of the STB;
   receive inbound messages via the ICL; and,
   generate a second relay command signal in response to the received inbound messages.

2. The two hand control safety system of claim 1, wherein the ICL comprises a serial data channel.

3. The two hand control safety system of claim 1, wherein the ICL comprises an optical data channel.

4. The two hand control safety system of claim 1, wherein the ICL port further comprises a wireless network component.

5. The two hand control safety system of claim 4, wherein the ICL comprises a wireless channel.

6. The two hand control safety system of claim 1, further comprising a second STB comprising:
   a second housing;
   a second sensor configured to generate a second presence signal in response to the proximity of an operator's hand to the second housing;
   a second relay control output interface (RCOI) configured to transmit a third relay command signal to a second relay;
   a second intercommunications link port operatively coupled to the intercommunication link (ICL);
   a second controller operably coupled to the second sensor, the second RCOI and the second intercommunications link port;
   a second data store operably coupled to the second controller, wherein the second data store comprises a second program of instructions that, when executed by the second controller, cause the second controller to perform operations to actuate a second relay, the operations comprising:
   generate a third relay command signal in response to the generated second presence signal according to predetermined safety standard criteria;
   transmit the generated third relay command to the second relay via the second RCOI;
   send, via the second ICL port, outbound messages indicating a status of the second STB;
   receive inbound messages indicating the status of the first STB via the ICL; and, generate a fourth relay command signal in response to the received inbound messages.

7. The two hand control safety system of claim 6, wherein the ICL transfers bidirectional communications between the first STB and the second STB.

8. The two hand control safety system of claim 1, wherein the housing comprises a translucent material such that indicator lights disposed in the housing of the first STB indicate the status of the STB, wherein the indicator lights may flash in a predetermined pattern to indicate a fault in the first STB.

9. The two hand control safety system of claim 8, wherein the indicator lights may flash different colors to indicate a status of the first STB.

10. The two hand control safety system of claim 1, the operations further comprising instructions for self-diagnostic routines to determine whether the sensor is functioning properly.

11. A two hand control safety system, the system comprising:
    a first safety touch button (STB) comprising:
    a housing;
    a sensor configured to generate a presence signal in response to the proximity of an operator's hand to the housing;
    a relay control output interface (RCOI) configured to transmit a relay command signal to a relay;
    an intercommunications link port operatively coupled to an intercommunication link (ICL);
    a controller operably coupled to the sensor, the RCOI and the intercommunications link port;
    a data store operably coupled to the controller, wherein the data store comprises a program of instructions that, when executed by the controller, cause the controller to perform operations to actuate a relay, the operations comprising:
    generate a relay command signal in response to the generated presence signal according to predetermined safety standard criteria;
    transmit the generated relay command to the relay via the RCOI; and
    send, via the ICL port, outbound messages indicating a status of the STB.

12. The two hand control safety system of claim 11, wherein the ICL comprises a serial data channel.

13. The two hand control safety system of claim 11, wherein the ICL comprises an optical data channel.

14. The two hand control safety system of claim 11, wherein the ICL port further comprises a wireless network component.

15. The two hand control safety system of claim 14, wherein the ICL comprises a wireless channel.

16. The two hand control safety system of claim 11, wherein the housing comprises a translucent material such that indicator lights display in a predetermined pattern to indicate the status of the STB.

17. The two hand control safety system of claim 16, wherein the indicator lights may flash different colors to indicate a status of the first STB.

18. A two hand control safety system, the system comprising:
    a first safety touch button (STB) comprising:
    a housing;
    a sensor configured to generate a presence signal in response to the proximity of an operator's hand to the housing;
    a relay control output interface (RCOI) configured to transmit a relay command signal to a relay;
    a means for transferring bidirectional communications between the first STB and an external device;
    a controller operably coupled to the sensor, the RCOI and the transferring means;
    a data store operably coupled to the controller, wherein the data store comprises a program of instructions that, when executed by the controller, cause the controller to perform operations to actuate a relay, the operations comprising:
    generate a relay command signal in response to the generated presence signal according to predetermined safety standard criteria;
    transmit the generated relay command to the relay via the RCOI;
    send, via the transferring means, outbound messages indicating a status of the STB;
    receive inbound messages via the transferring means; and,
    generate a second relay command signal in response to the received inbound messages.

19. The two hand control safety system of claim 18, wherein the transferring means comprises a serial data channel.

20. The two hand control safety system of claim 18, wherein the transferring means comprises an optical data channel.

* * * * *